United States Patent
Shirakawa et al.

(10) Patent No.: US 7,723,696 B2
(45) Date of Patent: May 25, 2010

(54) RADIATION DETECTED VALUE FORECASTING METHOD AND FORECAST RESPONSIVE RADIATION DETECTOR

(75) Inventors: Yoshiyuki Shirakawa, Chiba (JP); Hiro Amano, Tokyo (JP)

(73) Assignees: National Institute of Radiological Sciences, Chiba-shi (JP); Amano & Associates, Inc., Tokyo (JP)

( * ) Notice: Subject to any disclaimer, the term of this patent is extended or adjusted under 35 U.S.C. 154(b) by 215 days.

(21) Appl. No.: 11/883,348

(22) PCT Filed: Feb. 16, 2006

(86) PCT No.: PCT/JP2006/302748
§ 371 (c)(1),
(2), (4) Date: Aug. 16, 2007

(87) PCT Pub. No.: WO2006/090634
PCT Pub. Date: Aug. 31, 2006

(65) Prior Publication Data
US 2008/0272305 A1    Nov. 6, 2008

(30) Foreign Application Priority Data
Feb. 22, 2005  (JP)  ............... 2005-046057
Feb. 6, 2006   (JP)  ............... 2006-028684

(51) Int. Cl.
    *G01T 1/02*    (2006.01)
(52) U.S. Cl. ..................... 250/395
(58) Field of Classification Search .......... 250/395
    See application file for complete search history.

(56) References Cited

U.S. PATENT DOCUMENTS 6,781,130 B2 *    8/2004    Frederick et al. ........ 250/361 R

FOREIGN PATENT DOCUMENTS

| JP | A 56-150372  | 11/1981 |
| JP | A 7-181263   | 7/1995  |
| JP | A 2001-208848 | 8/2001 |
| JP | A 2002-228753 | 8/2002 |

* cited by examiner

*Primary Examiner*—Constantine Hannaher
(74) *Attorney, Agent, or Firm*—Oliff & Berridge, OLC

(57) ABSTRACT

In a radiation detector, a response is approximated as a primary delay system, and when a time constant T indicating the characteristic of the response is known, a final response value $N_0$ is forecasted from dose rates or counting rates $N_1$ and $N_2$ of two points in the initial or middle stage of response. When the time constant T is unknown, the final response value $N_0$ is forecasted from dose rates or counting rates $N_1$, $N_2$, and $N_3$ of three points in the initial or middle stage of response. Simultaneously, a time constant is obtained and the soundness of the radiation detector is also evaluated. Thereby, a dose rate in an existence field of radiation or a counting rate in an existence field of radioactive materials is quickly and accurately forecasted, whereby the measurement time is shortened.

15 Claims, 16 Drawing Sheets ( ) : Forecasted value

RADIATION DETECTED VALUE FORECASTING METHOD AND FORECAST RESPONSIVE RADIATION DETECTOR

TECHNICAL FIELD

The present invention relates to a radiation detected value forecasting method for quickly measuring an air dose rate in an existence field of radiation or a counting rate of radiation in an existence field of radioactive materials in a stationary state or while moving, a forecast responsive radiation detector using said forecasting method, and a radiation monitoring method using said radiation detector in the fields of the atomic industry, radiation medicine, radiation industrial measurement, and nondestructive inspection, etc., involving use of radioactive materials or radiation.

BACKGROUND ART

A radiation detector such as a conventional radiation detector to be used as a survey meter is for obtaining a dose rate as a dose per unit time and/or a counting rate as a count per unit time. In this case, first, a place where a natural radiation level (hereinafter, referred to as background) is significantly exceeded is found while moving, and next, at this place, measurement is performed for an appropriate period of time, and then a final dose rate or counting rate (also referred to as a final response value in a stationary state) is measured after stable indication is obtained in general.

Therefore, for example, in the case of an accidental radiation exposure emergency, to measure an air dose rate and/or a counting rate of a contaminated site, a wide range is measured while moving the radiation detector such as a survey meter, and at a place recognized as abnormal, the radiation detector is made stationary for measurement more than 30 seconds to 60 seconds, so that completion of the measurement consumes a great deal of time. When a measured value is read while the survey meter or the like is moved for inspecting contaminated sites, for example, when the distance to a measuring target is 10 mm, a time constant is 10 seconds, and a movement speed is 50 mm per second, an output suddenly lowers to about 10% to 15% of the final response value in a stationary state, so that it is difficult for unskilled persons to find abnormal sites under the present circumstances.

In the case of human body contamination inspection, when it takes a long time per one examinee, if a large number of examinees must be inspected, delay of the inspection and the exposure of the inspecting person become serious problems. Furthermore, routine radiation control takes a long time if the number of measuring sites is large.

On the other hand, a forecast responsive clinical thermometer which forecasts a final response value of a body temperature has been made practicable as one similar to the present invention. However, the number of electrons to be emitted from a thermistor or the like is large and the time constant is fixed and known, so that the forecasting is simple, and it cannot be used for a radiation detector in which emission of radiation occurs one by one as a probabilistic event and is greatly scattered.

DISCLOSURE OF THE INVENTION

The present invention was made to solve the conventional problems, and an object thereof is to enable forecasting of a radiation detected value and greatly shorten the measurement time.

Another object of the present invention is to enable forecasting of a radiation detected value while moving and greatly shorten the measurement time.

Still another object of the present invention is to make it easy even for unskilled persons to find abnormal sites.

According to the present invention, when obtaining a dose rate or a counting rate by using a radiation detector such as a survey meter in an existence field of radiation or radioactive materials, a final response value is forecasted by using dose rates or counting rates of two or more points in the initial or middle stage of response before reaching the final response value, whereby the above-described problems are solved.

By using dose rates or counting rates $N_1$ and $N_2$ of two points in the initial or middle stage of response, the final response value $N_0$ is quickly forecasted from the following equation:

$$N_0 = (N_2 - C*N_1)/(1-C)$$

provided that
  $C = \exp(-\Delta t/T)$
  $\Delta t$: time between two points
  T: time constant of response Alternatively, by using dose rates or counting rates $N_1$, $N_2$, and $N_3$ of three points in the initial or middle stage of response, the final response value $N_0$ is forecasted from the following equation:

$$N_0 = (N_2*N_2 - N_1*N_3)/(2*N_2 - N_1 - N_3)$$

so that forecasting is possible even when the time constant is unknown.

Furthermore, at the same time, a time constant indicating the characteristic of response is obtained so as to enable evaluation of the soundness of the radiation detector.

According to the present invention, when a time constant is 10 seconds, a dose rate as a dose per unit time and/or a counting rate as a count per unit time can be obtained in 5 seconds of half the time constant, and the measurement time that conventionally took from 30 seconds to 60 seconds in general can be significantly shortened. Therefore, this is useful for both radiation measurement at the time of an accident and usual radiation measurement.

In addition, by obtaining a time constant at the same time, the soundness of the radiation detector can be evaluated.

According to the present invention, responses of radiation detected values are approximated as a primary delay system, and when a time constant indicating the characteristic of the response is known, a final response value is forecasted from two dose rates or counting rates in the initial or middle stage of response. Alternatively, when the time constant indicating the characteristic of the response is unknown, a final response value is forecasted from three dose rates or counting rates in the initial or middle stage of response.

Herein, the initial stage of response is from the start of measurement to about 0.5 times the time constant T as shown in FIG. 1, and the middle stage of response is from 0.5 to 1.5 times the time constant T, and for example, when T=10 seconds, the initial stage is from 0 to 5 seconds and the middle stage is from 5 to 15 seconds.

According to the present invention, when obtaining a dose rate or counting rate by using a radiation detector such as a survey meter in an existence field of radiation or radioactive materials, output values of the radiation detector are measured while moving the radiation detector by using two or more points of measured values of dose rates or counting rates and a final response value which will be obtained by measurement while making the radiation detector stationary near the position where the output values were obtained, is forecasted, whereby the above-described problems are solved.

That is, responses of the radiation detected values are approximated as a primary delay system, a time constant indicating the characteristic of the response is set in advance, and as output values of the radiation detector, measured values of dose rates or counting rates measured at two or more points while moving the radiation detector are used to forecast a final response value that will be obtained through measurement while making the detector stationary near the points at which the output values were obtained.

In detail, when an elapsed time since the start of response is defined as t seconds and a time constant of the primary delay system is defined as T seconds, the response value N in the middle can be expressed as follows:

$$N = N_0(1 - \exp(-t/T)) \quad (1)$$

By defining a response value at an elapsed time of t1 seconds as N1, a response value at an elapsed time of t2 seconds as N2, and a time constant set in advance as T, the following constant is defined:

$$C = \exp[-(t_2 - t_1)/T] \quad (2)$$

From Equation (1), $$N_1 = N_0 * (1 - \exp(-t_1/T)) \quad (3)$$

$$N_2 = N_0 * (1 - \exp(-t_2/T)) \quad (4)$$

Herein, $t_2 > t_1$. When these Equation (3) and Equation (4) are simultaneously solved for $N_0$, the following equation:

$$N_0 = N_1 + (N_2 - N_1)/(1 - C) \quad (5)$$

is obtained which can be interpreted as indicating that the initial value $N_1$ at the elapsed time of $t_1$ seconds and a response change $N_2 - N_1$ until the elapsed time of $t_2$ seconds are multiplied by a gain of $1/(1-C)$.

By using FIG. 2 through FIG. 4, it is shown that Equation (5) is satisfied in all stages of response. When radiation to enter the radiation detector is regarded as an input, all input time series can be sufficiently approximated by synthesis of rectangular pulses that last for a certain period of time. I of FIG. 2 denotes an input, which lasts from the time of 10 seconds to the time of 15 seconds, and a counting rate is 1000 counts per minute. This rectangular pulse input is regarded as a synthesis of a step input Iu of a count rate of 1000 counts per minute lasting from the time of 10 seconds of FIG. 3 and an input Id of −1000 counts per minute lasting from the time of 15 seconds. Response of the inputs In and Id are Ru and Rd expressed by Equation (1). Therefore, the response R of the rectangular pulse input I is a result of summing Ru and Rd.

Next, the behavior of Equation (5) will be made clear in FIG. 4. When arbitrary two points P1 and P2 in a range between 10 seconds and 15 seconds in which Ru and R completely overlap are applied into Equation (5), 1000 counts per minute is obtained. Next, the case after the time of 15 seconds will be considered. With respect to two points P3 and P4 on R, P5 and P7 at the same time as P3 and P6 and P8 at the same time as P4 satisfy the following relationships:

$$P3 = P5 + P7 \quad (6)$$

$$P4 = P6 + P8 \quad (7)$$

When P3 and P4 are applied into Equation (5), the following is obtained:

$$N0 = P3 + (P4 - P3)/(1 - C) = (P5 + P7) + ((P6 + P8) - (P5 + P7))/(1 - C) = (P5 + (P6 - P5)/(1 - C)) + (P7 + (P8 - P7)/(1 - C)) = (1000) + (-1000) = 0 \quad (8)$$

That is, when the input I after the time of 15 seconds becomes 0, Equation (5) indicates 0.

Therefore, Equation (5) indicates that an input value (corresponding to a final response value), that is, herein, a final response value of the radiation detector can be forecasted by using the response values in all stages of response.

When considering a certain time (response value $N_1$) and a time (response value $N_2$) immediately after the certain time during movement of the radiation detector, if air dose rates or counting rates at the moving locations during this time period are constant, regardless of the way of selecting the time and the movement speed, a final response value that will be obtained through measurement by making the radiation detector stationary near the locations passed by can be forecasted from Equation (5).

FIG. 5 shows an input I when one location (corresponding to movement speed×elapsed time) is contaminated, and a response R and a forecasted value P thereof. The input I and the forecasted value P coincide with each other.

The present invention is effective not only when one point is contaminated as shown in FIG. 5 but also when a plurality of points are contaminated as shown in FIG. 6 and when successive points are contaminated as shown in FIG. 7.

FIG. 6 shows inputs $I_1$ and $I_2$ when locations remote from each other (corresponding to movement speed×elapsed time) are contaminated, and responses R and forecasted values $P_1$ and $P_2$ thereof. The input $I_1$ and the forecasted value $P_1$ coincide with each other, and the input $I_2$ and the forecasted value $P_2$ coincide with each other.

FIG. 7 shows inputs $I_1$ and $I_2$ when locations adjacent to each other (corresponding to movement speed×elapsed time) are contaminated, and responses R and forecasted values $P_1$ and $P_2$ thereof. The input $I_1$ and the forecasted value $P_1$ coincide with each other, and the input $I_2$ and the forecasted value $P_2$ coincide with each other.

The forecasted value of the final response value defined as $N_0$ can be made highly accurate by using the moving average.

In addition, the present invention provides a forecast responsive radiation detector in which the radiation detected value forecasting method described above is employed.

In addition, both the forecasted value and the measured value can be displayed.

In addition, the horizontal axis is made to correspond to time or distance, and both the forecasted value and the measured value can be displayed on the vertical axis by means of liquid crystals and so on.

In addition, the vertical axis is made to correspond to time or distance, and both the forecasted value and the measured value can be displayed on the horizontal axis by means of liquid crystals and so on.

In addition, position information based on a GPS or the like, the forecasted value, and the measured value can be displayed together on a map by means of liquid crystals and so on.

In addition, a warning to be issued when the forecasted value 160 is equal to or more than a threshold 162 may be expressed as a sound 164 or light 166. Herein, the sound may include an audible warning means such as sirens or automatic announcements, and the light may include a lamp, LED, red light, red flasher, or the like.

In addition, a warning to be issued when the forecasted value is equal to or more than a threshold may be transmitted to a management device 168 or control device by means of communications 170. Thereby, for example, a warning can be automatically transmitted to a mobile phone of a person in charge or a surveillance monitor. Alternatively, the warning may be synchronized with position information from a position detector such as a GPS and a surveillance camera may be turned toward a warning issuing position when a warning is issued, or an emergency door may be automatically closed. Furthermore, it is also possible that a plurality of thresholds are ranked and set, and a ranking map of dose rates or counting rates is automatically created through automatic mapping.

Furthermore, the present invention provides a radiation monitoring method using the above-described moving type forecast responsive radiation detector.

According to the present invention, a dose rate as a dose per unit time and/or a counting rate as a count per unit time can be forecasted during movement without stillness. For example, when obtaining a counting rate at a contaminated site at about 500 mm from a certain reference point in a stationary state of a survey meter or the like, in the case where the time constant is 10 seconds and the movement speed is 50 mm per second shown in FIG. 8 (total), FIG. 9 (detailed), and FIG. 10 (enlarged rise of the measured value), at a time indicating a maximum forecasted value, that is, immediately after passing the position of 500 mm, in two seconds in terms of elapsed time as a movement time from 450 mm and 550 mm, the rate can be obtained. A stationary state is not necessary, so that the measurement time which conventionally took from 30 seconds to 60 seconds per one measuring site can be significantly shortened. Therefore, this is useful for both radiation measurement at the time of an accident and usual radiation measurement. In addition, a measured value in a stationary state is forecasted, and this is larger than an actual measured value, so that even unskilled persons can also find abnormal sites.

In a state that a contaminated site is passed and an output value decreases, the forecasted value becomes equivalent to a background, so that the end of the contaminated site can be known. That is, the start of the contaminated site can be known when the forecasted value rises, and the end of the contaminated site can be known when the forecasted value becomes equivalent to a background.

BEST MODE FOR CARRYING OUT THE INVENTION

Hereinafter, embodiments of the present invention will be described with reference to the drawings.

Figure 11:
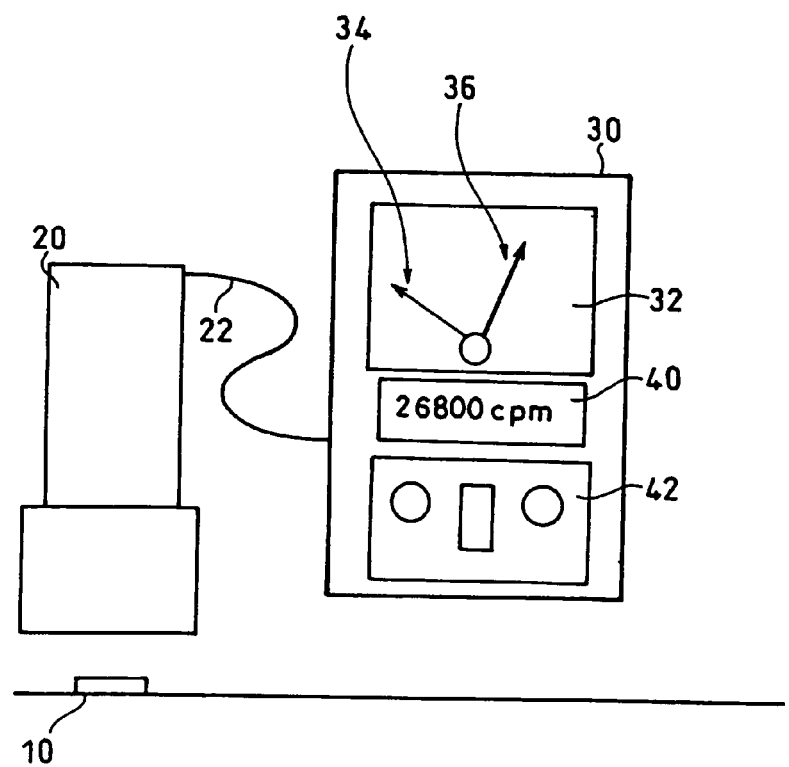
FIG. 11 is a front view showing constructions of first and second embodiments of the present invention.

A first embodiment of a radiation detector according to the present invention includes, as shown in FIG. 11, a probe 20 disposed near a radiation source 10 as a measuring target, and a detector 30 into which an output of the probe 20 is inputted via a cable 22.

The detector 30 includes an analog display 32 including a current value pointer 34 which indicates an actual measured value momentarily and a forecasted value pointer 36 which indicates a forecasted value according to the present invention, a digital display 40 which can display a current value and a forecasted value in a switching manner, and an operating part 42.

Figure 12:
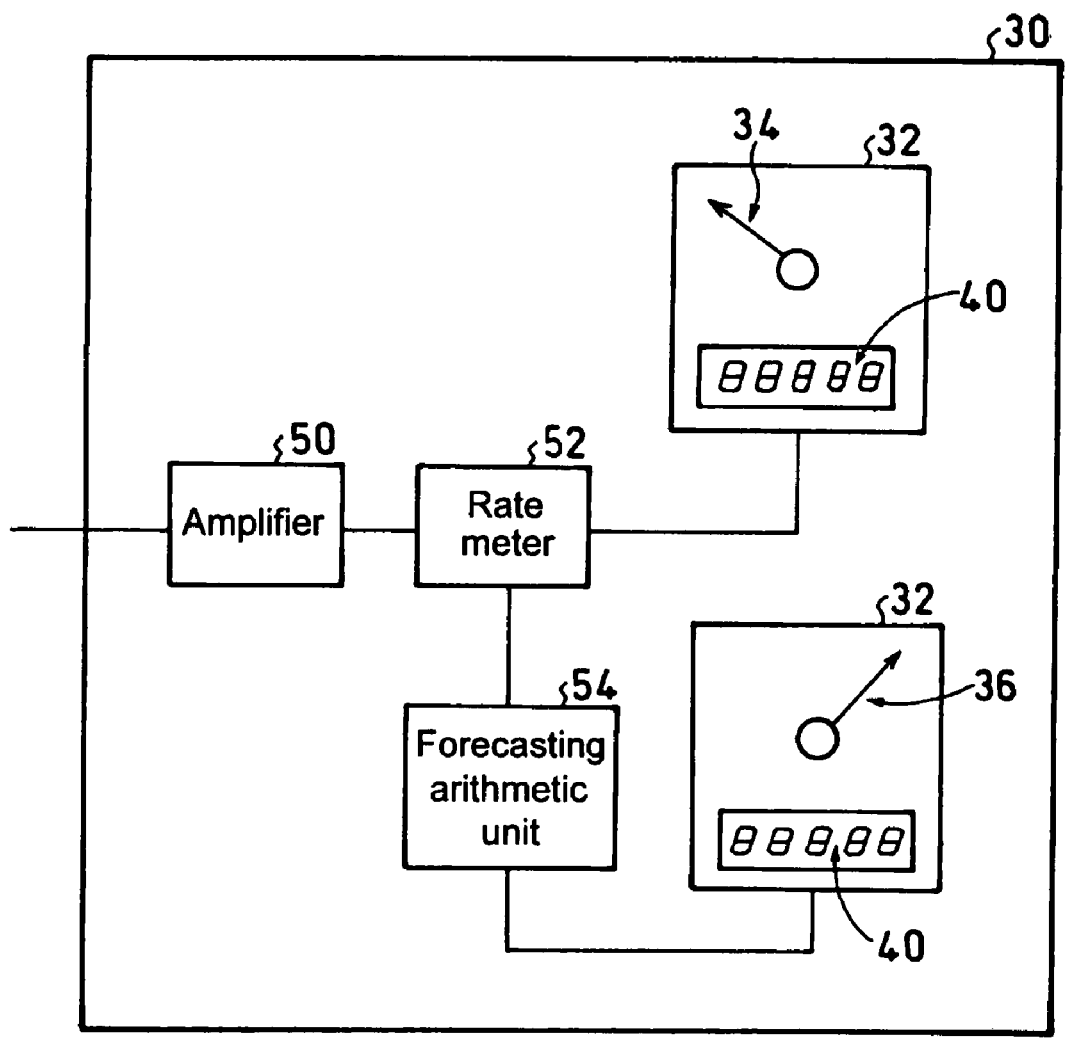
FIG. 12 is a block diagram showing a construction of a detector of the same.

Inside the detector 30, as shown in detail in FIG. 12, an amplifier 50 which amplifies signals from the probe 20, a rate meter 52 which converts an output of the amplifier 50 into a dose rate or a counting rate and uses it as a current value, and a forecasting arithmetic unit 54 which receives a signal from the rate meter 52 and forecasts a final response value according to the present invention and outputs it, are provided.

Hereinafter, the operation of the forecasting arithmetic unit 54 of the first embodiment which is used when the time constant is known will be described.

Figure 13:
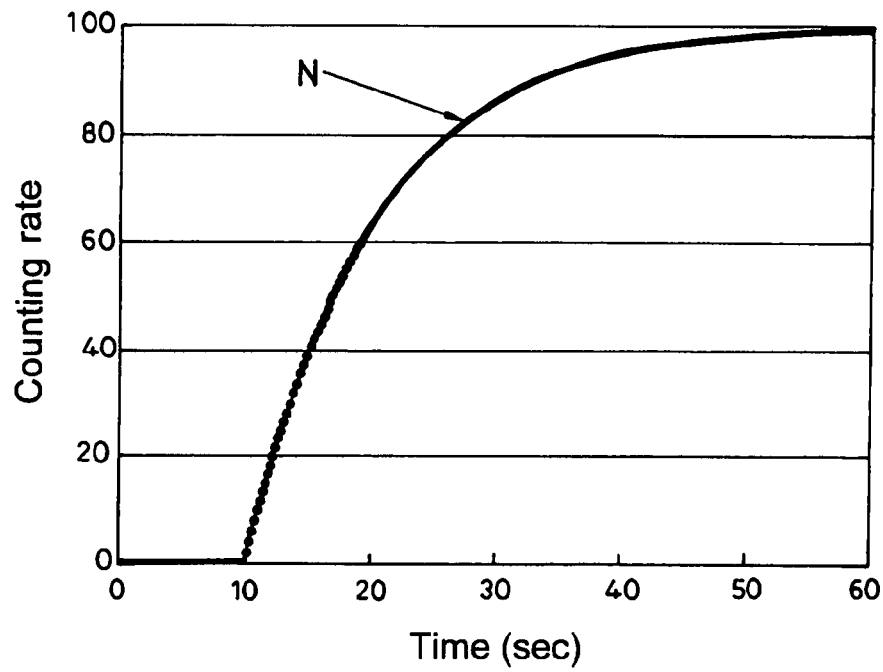
FIG. 13 is a diagram for explaining a measurement principle of the present invention.

In this embodiment, the process until radiation enters the probe 20 of the radiation detector and is detected and outputted by the rate meter 52 and indicated is approximated by "primary delay system." When the final response value (also referred to as final value, simply) $N_0$ is 100, the elapsed time since the start of response is t (seconds), and the time constant of the primary delay system is T (seconds), the response value N in the middle can be expressed by the response curve of FIG. 13, that is:

$$N=100(1-\exp(-t/T)) \quad (9)$$

Figure 14:
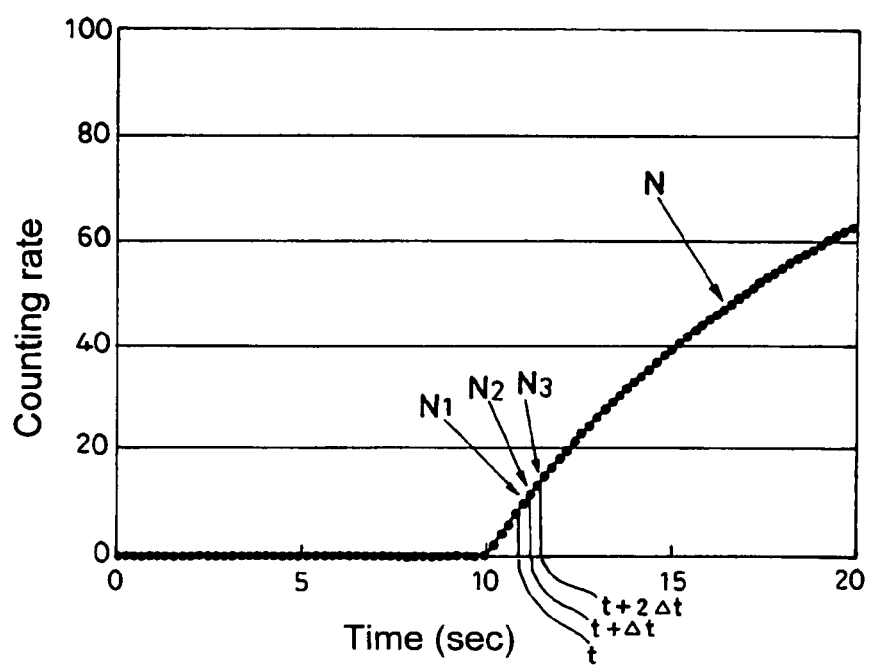
FIG. 14 is a diagram showing details of a rise of the same.

The state from the initial stage to the middle stage of this response curve N is shown in FIG. 14. The elapsed time $t_1$ is set to t (seconds), the response value in this case is set as $N_1$, the small time is set as $\Delta t$ (seconds), the response value in this case is set as $N_2$, and the response value after $\Delta t$ (seconds) further is $N_3$. Herein, as in this embodiment, when the time constant T is known in advance, in the case of:

$$C=\exp(-\Delta t/T) \quad (10)$$

the following are satisfied:

$$N_1=N_0*(1-\exp(-t/T)) \quad (11)$$

$$N_2=N_0*(1-C*\exp(-t/T)) \quad (12)$$

When these (11) and (12) are simultaneously solved for $N_0$, $$N_0=(N_2-C*N_1)/(1-C) \quad (13)$$

is obtained. In this case, $N_0=100$ is the solution. Therefore, by applying the response values $N_1$ and $N_2$ of two points into the simultaneous equations (11) and (12) in the initial or middle stage of response and solving the equations, the solution is obtained before the time reaches the final response value $N_0$, and the measurement time can be significantly shortened.

Next, the operation of the forecasting arithmetic unit 54 of the second embodiment to be used in the case the time constant is unknown will be described.

In this embodiment, the time constant T is not known in advance, so that when assuming:

$$C=\exp(-\Delta t/T) \quad (14)$$

the following are satisfied:

$$N_1=N_0*(1-\exp(-t/T)) \quad (15)$$

$$N_2=N_0*(1-C*\exp(-t/T)) \quad (16)$$

$$N_3=N_0*(1-C*C*\exp(-t/T)) \quad (17)$$

C is eliminated from these Equations (15), (16), and (17) and these equations are simultaneously solved for $N_0$, whereby the following:

$$N_0=(N_2*N_2-N_1*N_3)/(2*N_2-N_1-N_3) \quad (18)$$

is obtained. In this case, $N_0=100$ is the solution. By measuring response values $N_1$, $N_2$, and $N_3$ of three points are measured in the initial or middle stage of response and applied into the simultaneous equations (15), (16), and (17), and the equations are solved, whereby the solution is obtained before the time reaches the final response $N_0$, and the measurement time can be significantly shortened.

At the same time, the time constant T can also be calculated as:

$$T=-t/\ln[(N_3-N_2)/(N_2-N_1)] \quad (19)$$

The time constant indicates a response of the whole detector from an input to an output, and the time constant of the whole system during the measurement is fixed regardless of the intensity of radiation of the measuring target, the number of emitted radiation, and the number of detected radiation, so that it is possible to evaluate the soundness of the detector itself from a level of a change and a change with time in the obtained time constant and know deterioration or the like of the device.

When an air dose rate is measured by using the radiation detector of the above-described embodiment, μ Sv/h value can be read in 5 seconds per one measuring site. It is also possible to continuously monitor only one point in a fixed manner. When measuring surface contamination, a count-per-minute value as a counting rate can be read in about 5 seconds per one measuring site. Therefore, radiation can be monitored while significantly reducing the measurement time per one point from the conventional time of about 30 seconds.

In the above-described embodiment, a current value and a forecasted value are both displayed, so that the approach of the current value to the forecasted value can be visually confirmed. It is also possible that only the forecasted value is displayed.

In the above-described embodiment, a moving average is used, so that a dose rate or a counting rate of radiation wherein emission of radiation occurs one by one as a probabilistic event and greatly scattered, can be reliably forecasted.

Figure 15:
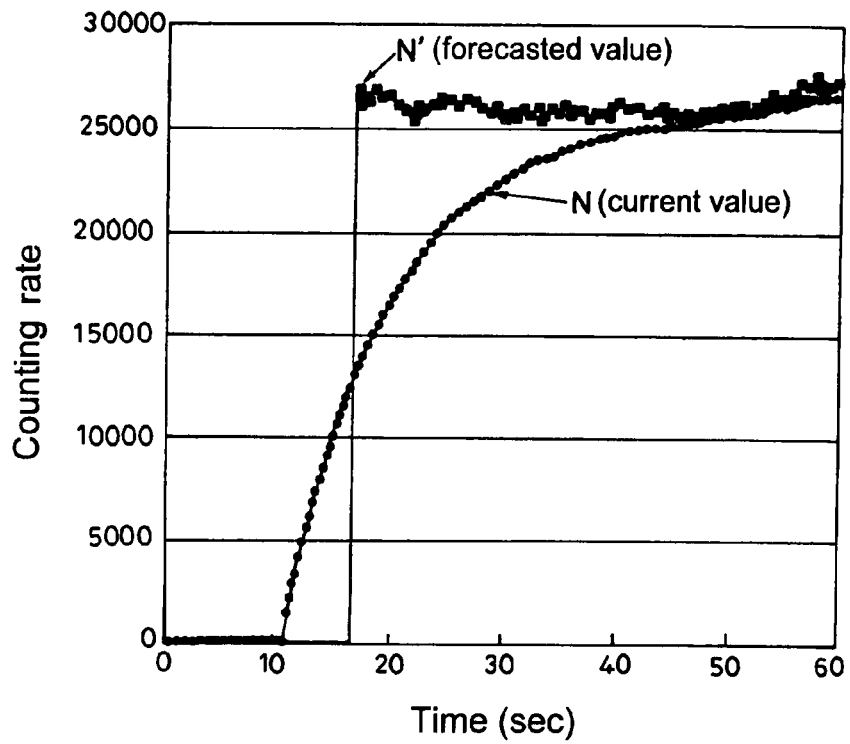
FIG. 15 is a diagram showing a response and forecasted response by a detector of the embodiment.
Figure 16:
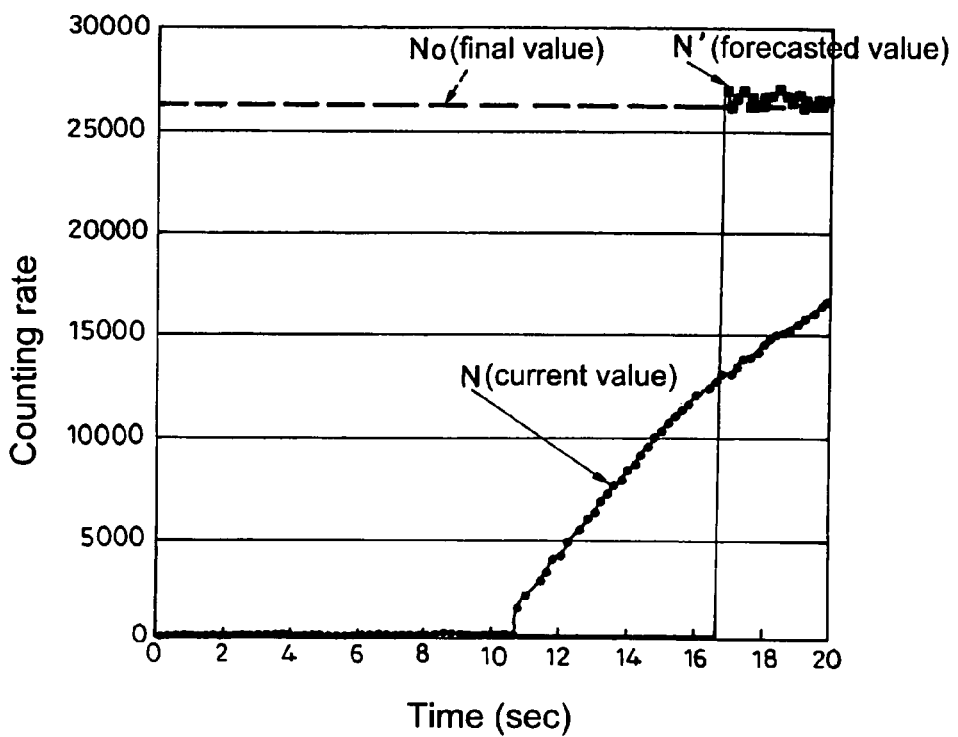
FIG. 16 is a diagram showing details of a rise of the same.

The counting rate was measured by using the first and second embodiments. The response curves N of FIG. 15 (total) and FIG. 16 (initial to middle stage) indicate output changes with time of an actual GM survey meter. As experiment conditions, the tip end of the probe 20 is positioned at a distance of 1 cm from a radiation source of strontium 90 with 37000 becquerels as the radiation source 10. The time constant T of the detector was set to 10 seconds. A counting rate $N_0$ in a stable state after 60 seconds or more elapsed was 26800 counts per minute.

The small time $\Delta t$ was set to 0.2 seconds.

Figure 17:
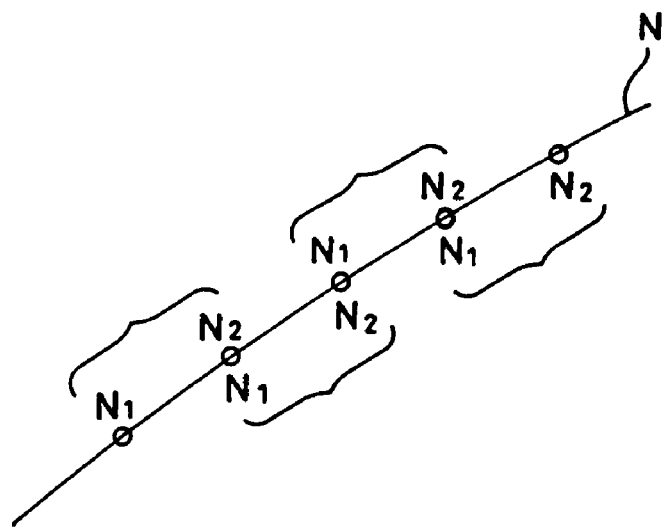
FIG. 17 is a diagram showing a moving average in the first embodiment.

In the example of the first embodiment, as shown in FIG. 17, $N_0$ was obtained based on Equation (13) from two successive points of the response curve N. Next, $N_0$ was obtained in the same manner from the end of these two points and the next point. By repeating this scanning 30 times while shifting the start point one by one, moving averages of the 30 times of scanning were obtained and indicated as a forecasted response curve N'. The first value of the forecasted values was 26944 counts per minute. This is very close to 26800 counts per minute of the final value $N_0$. The first forecasted value of the forecasted response curve N' was at the time of 6 seconds (0.2 seconds×30 times) after the start of measurement. It turns out that the measurement time was significantly shortened.

Figure 18:
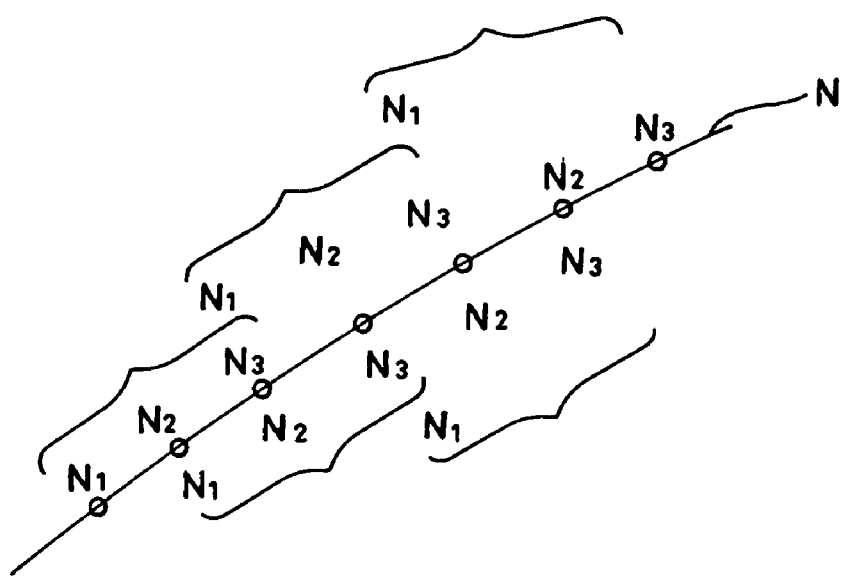
FIG. 18 is a diagram showing a moving average in a second embodiment.

Next, in the example of the second embodiment, as shown in FIG. 18, $N_0$ was obtained based on Equation (18) from three successive points. Next, $N_0$ was obtained in the same manner from the middle point and the end of the three successive points and the next point. By repeating this scanning 30 times while shifting the start point one by one, moving averages of the 30 times were obtained. The first value of the forecasted values was 26370 counts per minute. This is very close to 26800 counts per minute of the final value $N_0$. The first forecasted value was obtained at the time of 6 seconds after the start of measurement. It turns out that that the measurement time was significantly shortened. As the time constant T, a value from 8 to 12 seconds was calculated with respect to the true value of 10 seconds. This shows that the detector used for this measurement worked normally.

In the above-described embodiment, $\Delta t$ was set to 0.2 seconds and the number of times of the moving average was set to 30, however, it is also possible that, for example, $\Delta t$ is set to 0.1 seconds and the number of times of the moving average is set to 60, or $\Delta t$ is set to 1 second and the number of times of the moving average is set to 6. When the radiation source is high in intensity, forecasted values may be obtained after 3 seconds to 1 second since the start of measurement.

Figure 19:
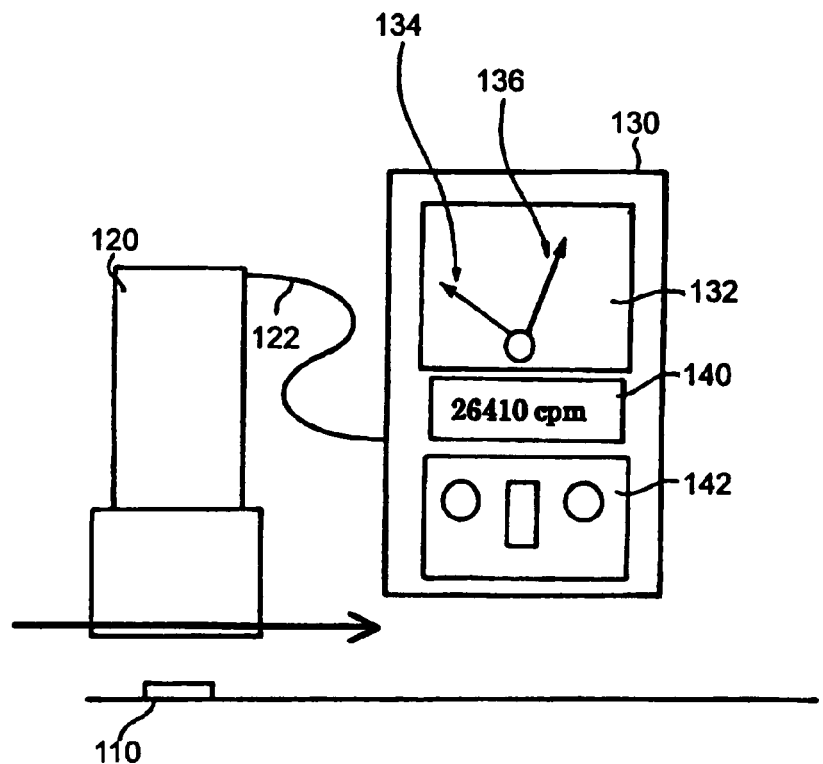
FIG. 19 is a front view showing a construction of a third embodiment of the present invention.

Next, a third embodiment of a radiation detector of the present invention applied to moving type forecasting includes, as shown in FIG. 19, a probe 120 which moves immediately above the radiation source 110 that imitates a contaminated site as a measuring target, and a detector 130 into which an output of the probe 120 is inputted via a cable 122.

The detector 130 includes an analog display 132 including a measured value pointer 134 which indicates an actual measured value momentarily and a forecasted value pointer 136 which indicates a forecasted value according to the present invention, and a digital display 140 which can display a measured value and a forecasted value in a switching manner, and an operating part 142.

Figure 20:
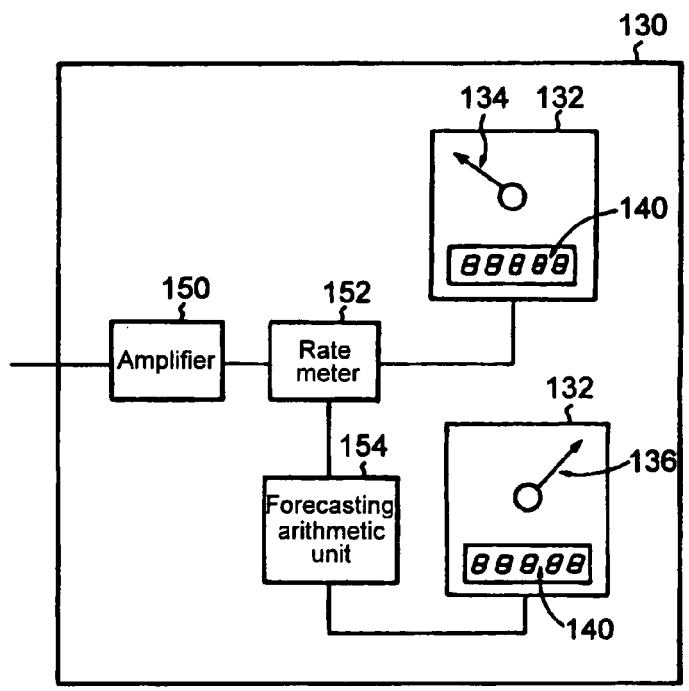
FIG. 20 is a block diagram showing a construction of a detector of the third embodiment.
Figure 21:
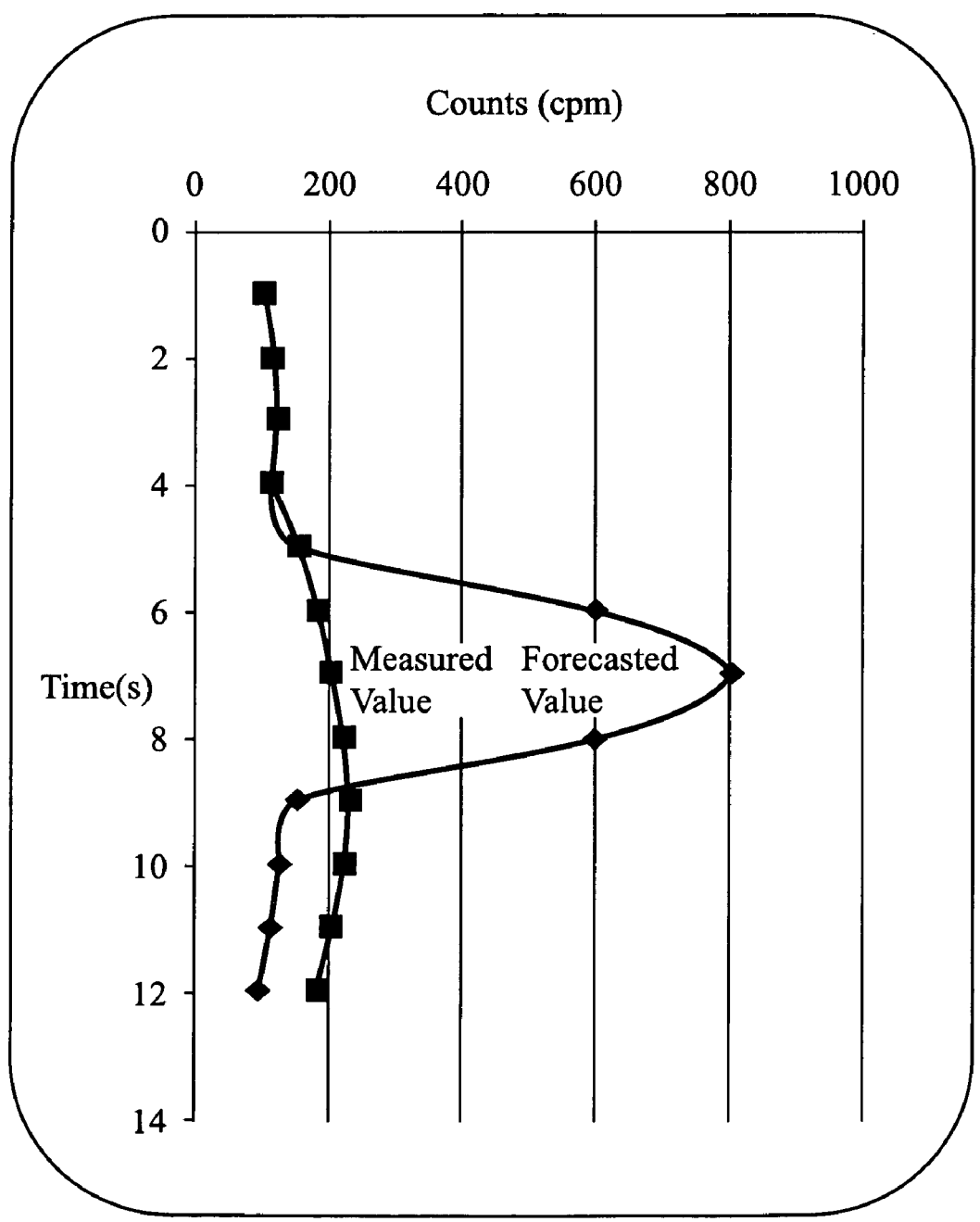
FIG. 21 is a diagram showing the measured value and forecast value on the same horizontal axis.
Figure 22:
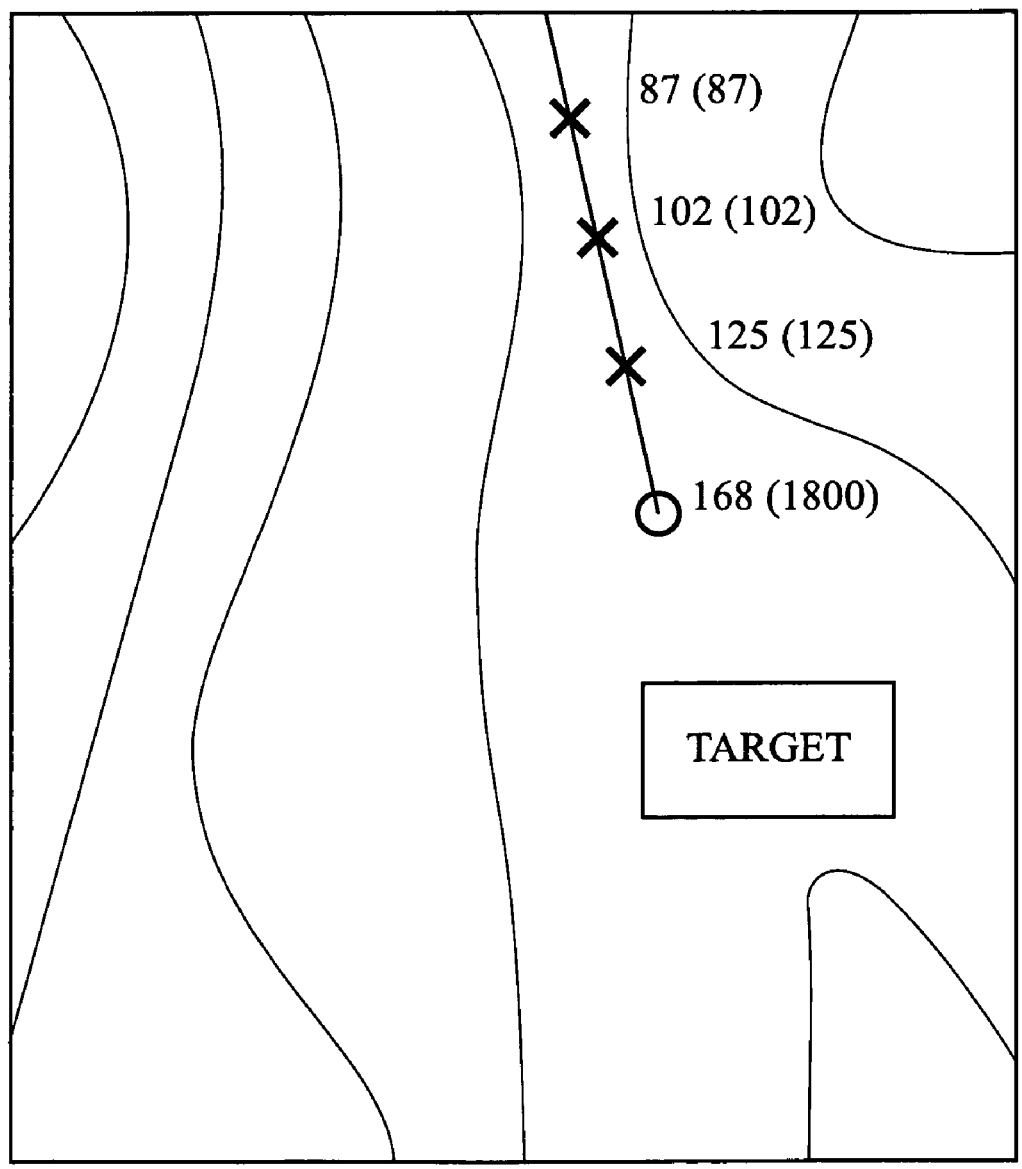
FIG. 22 is a view of a map showing position information obtained by a GPS, a forecasted value and a measured value on the same map.
Figure 23:
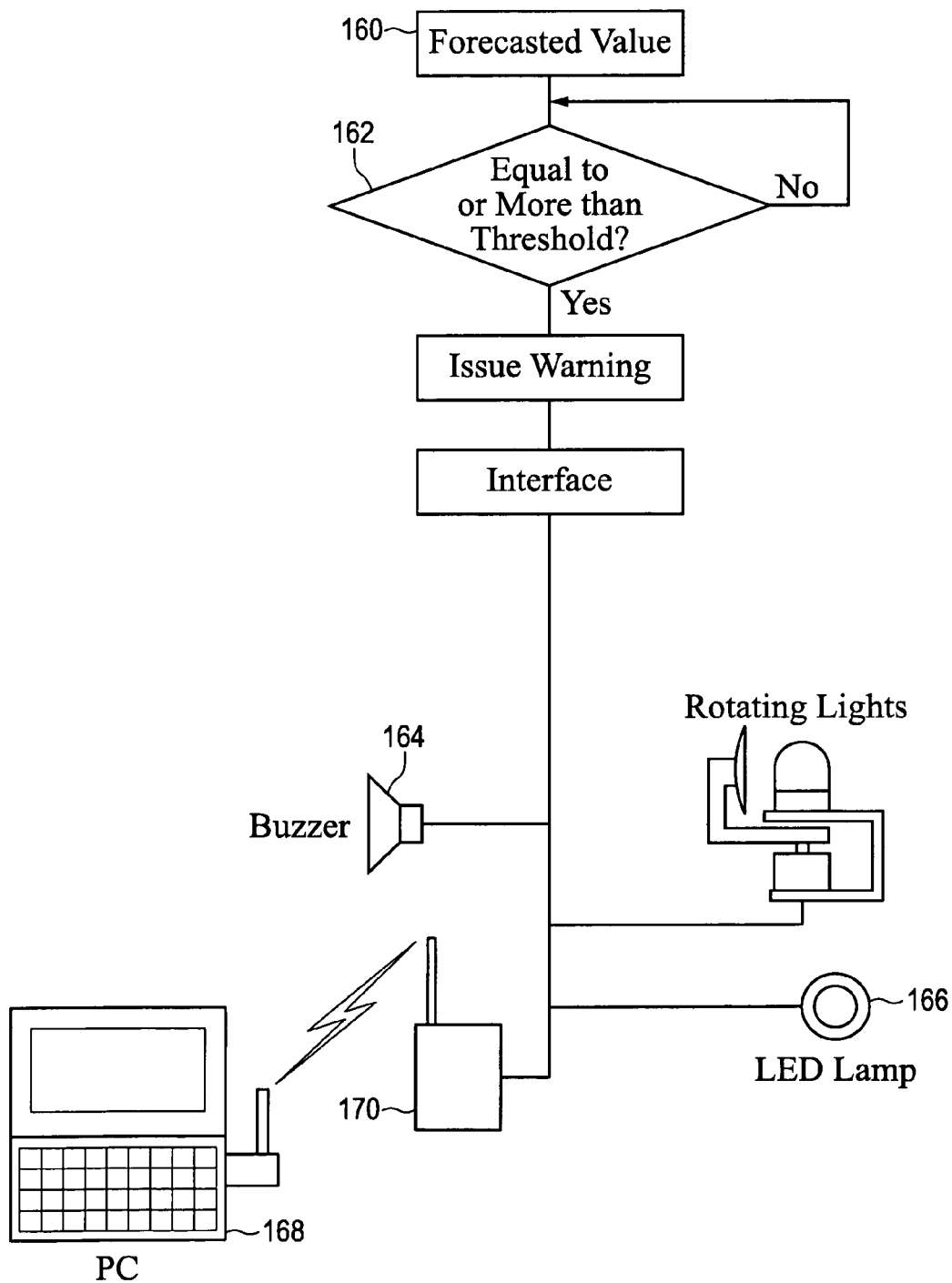
FIG. 23 is a diagram showing the generation of a warning signal from the forecasted value and threshold value.

Inside the detector 130, as shown in detail in FIG. 20, an amplifier 150 which amplifies signals from the probe 120, a rate meter 152 which converts an output of the amplifier 150 into a dose rate or a counting rate and uses it as a measured value, and a forecasting arithmetic unit 154 which receives a signal from the rate meter 152 and outputs a forecasted value according to the present invention.

Hereinafter, the operation of the forecasting arithmetic unit 154 will be described.

In this embodiment, the process until a radiation enters the probe 120 of the radiation detector and is outputted by the rate meter 152 and indicated is approximated by "primary delay system." A final response value at a position on the central axis of the probe 120 is defined as $N_0$ and response values $N_1$ and $N_2$ of two points in the stage of increase of the measured value during movement are measured and are applied into Equation (5) and the equation is solved, whereby a final response value in a stationary state is obtained as a solution $N_0$ in a moving state without making the probe 120 of the radiation detector stationary, and the measurement time can be significantly shortened. Then, in the stage of decrease of the measured value, response values $N_1$ and $N_2$ of two points are measured and applied into Equation (5) and the equation is solved, whereby a solution equivalent to the background as a final response value in a stationary state can be obtained in a moving state without making the probe 120 of the radiation detector stationary.

When an air dose rate is measured by using the radiation detector of the above-described embodiment, if an abnormal rise occurs with respect to the background when passing through a measuring site, a μ Sv/h value can be read in about 2 seconds. In the case of measurement of surface contamination, if an abnormal rise occurs with respect to the background when passing through a contaminated site, a count-per-minute value as a count rate can be read in about 2 seconds. Therefore, radiation can be monitored while significantly shortening the measurement time that conventionally took from 30 seconds to 60 seconds per one point.

In the above-described embodiment, a measured value and a forecasted value are both indicated, so that when the measured value rises, a simultaneous rise of the forecasted value to a maximum can be visually confirmed. It is also possible that only the forecasted value is indicated. The values may be digitally indicated or indicated by a pointer. Alternatively, the pointer may be displayed by liquid crystals.

Figure 1:
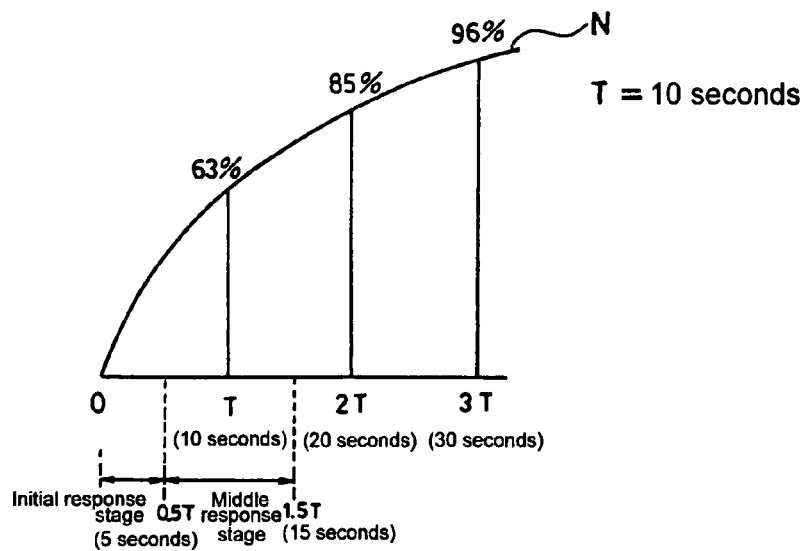
FIG. 1 is an explanatory view of a definition of terms to be used in the present invention.
Figure 2:
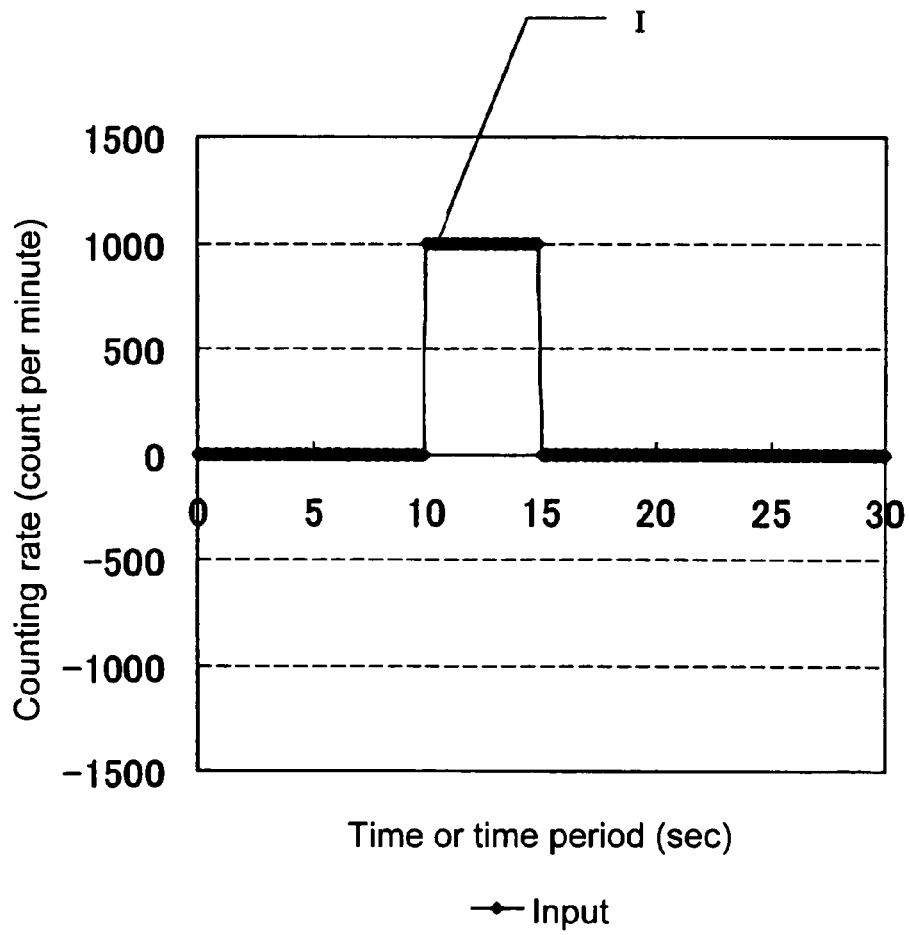
FIG. 2 is a diagram showing a rectangular pulse input for explaining the principle of the present invention.
Figure 3:
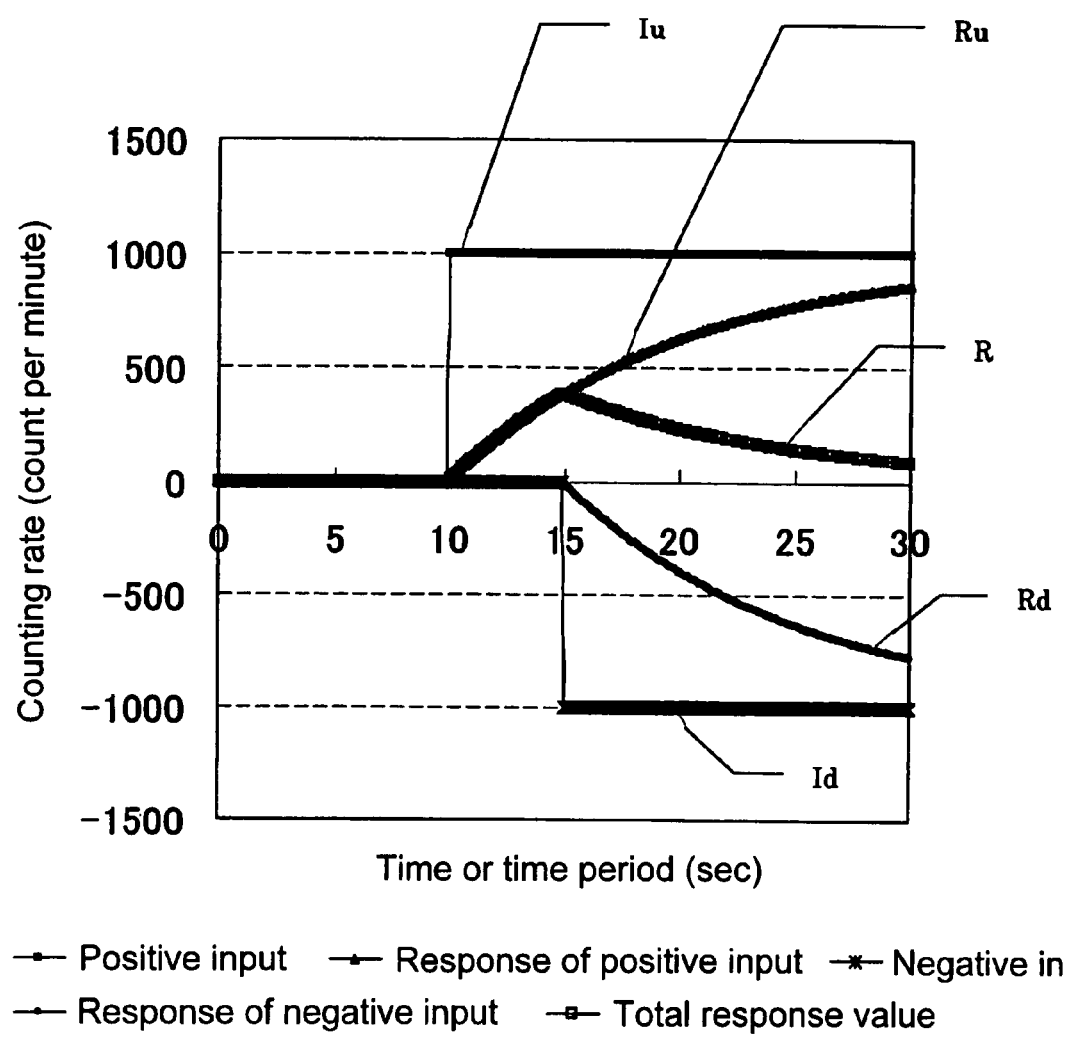
FIG. 3 is a diagram showing a step input and a response curve of the same.
Figure 4:
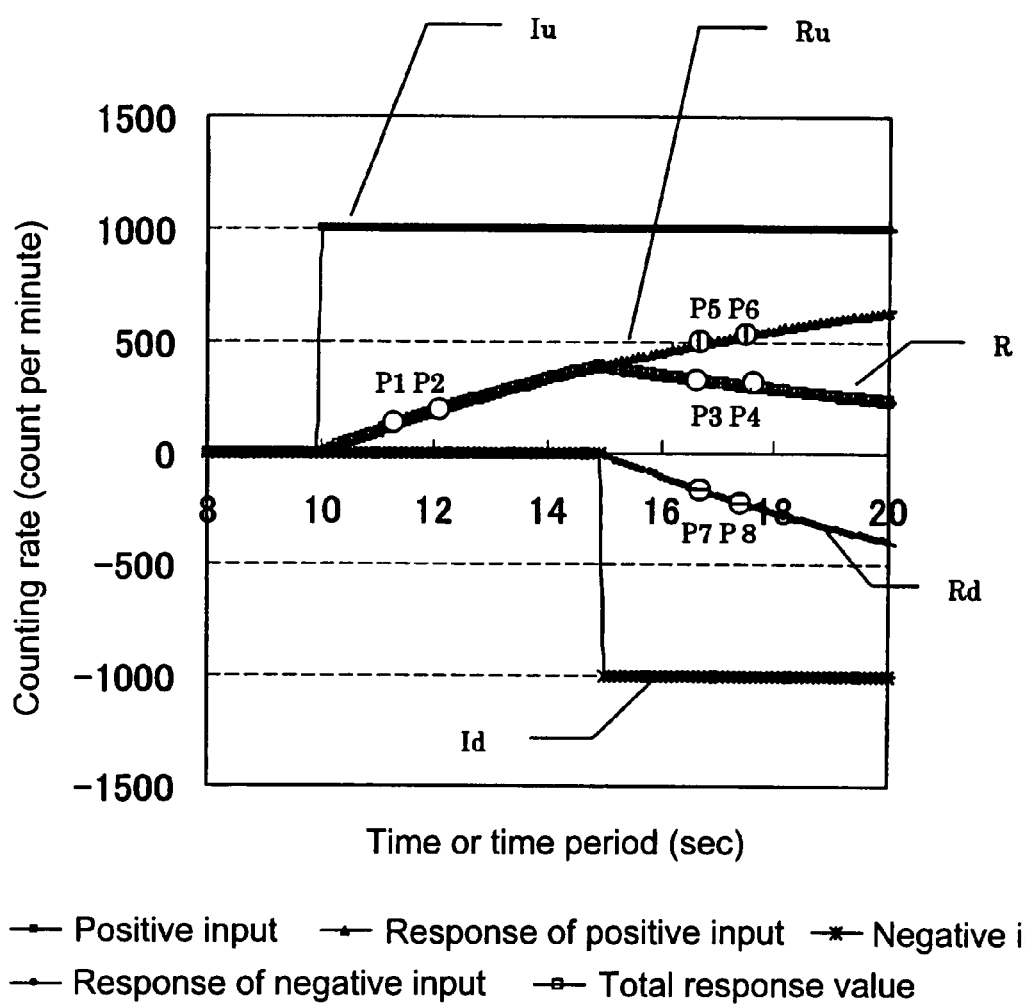
FIG. 4 is a diagram showing a forecast principle of the same.
Figure 5:
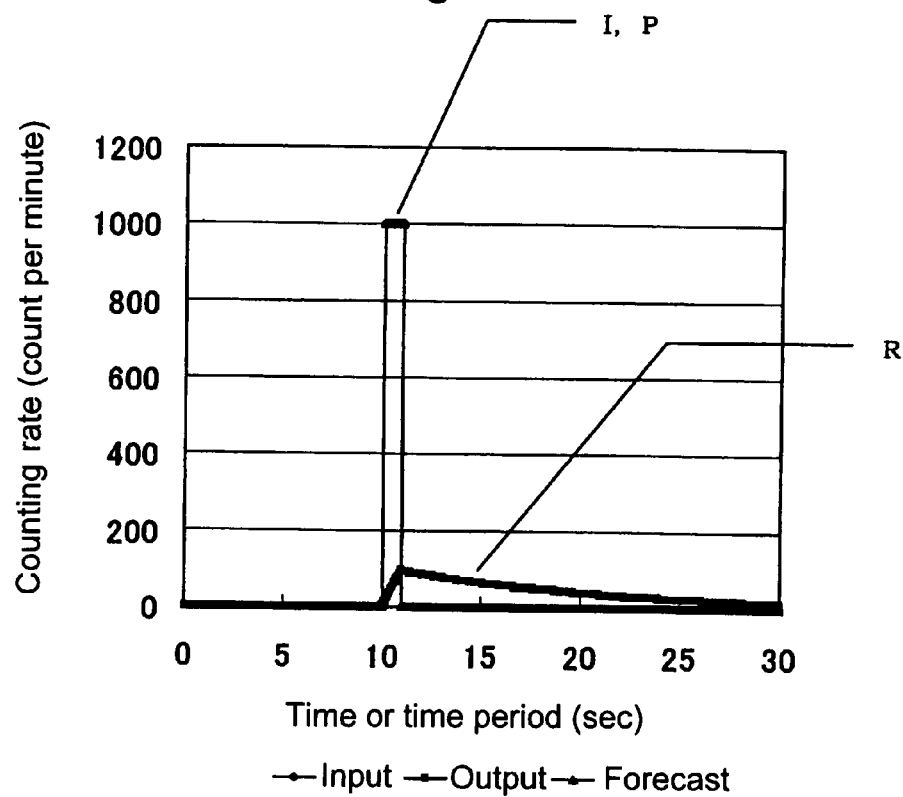
FIG. 5 is a diagram showing forecasting of a single contamination of the same.
Figure 6:
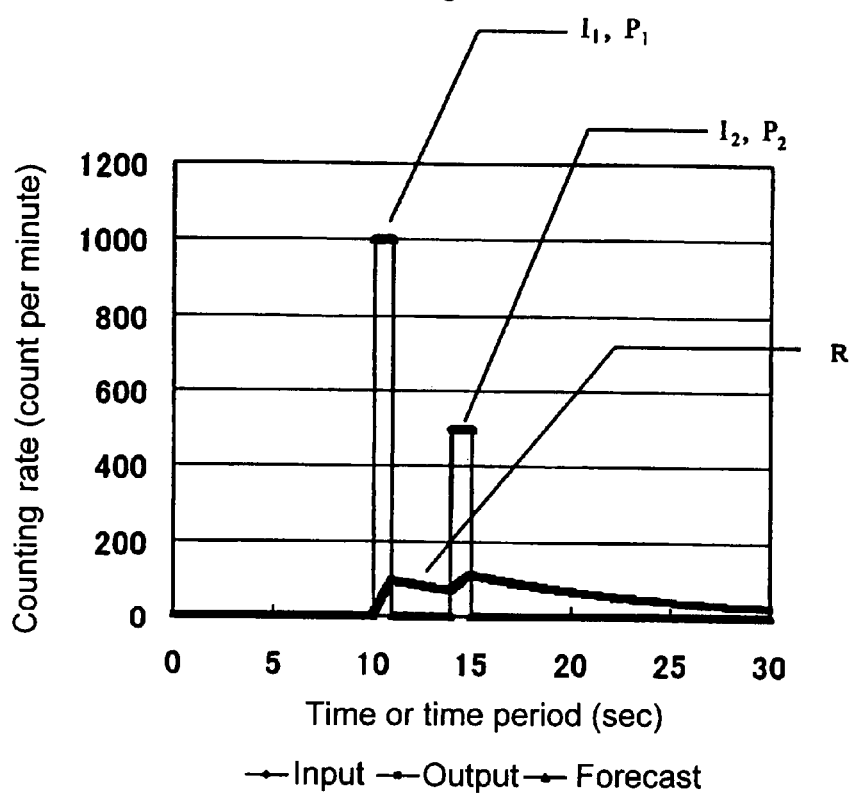
FIG. 6 is a diagram showing forecasting of remote contaminations of the same.
Figure 7:
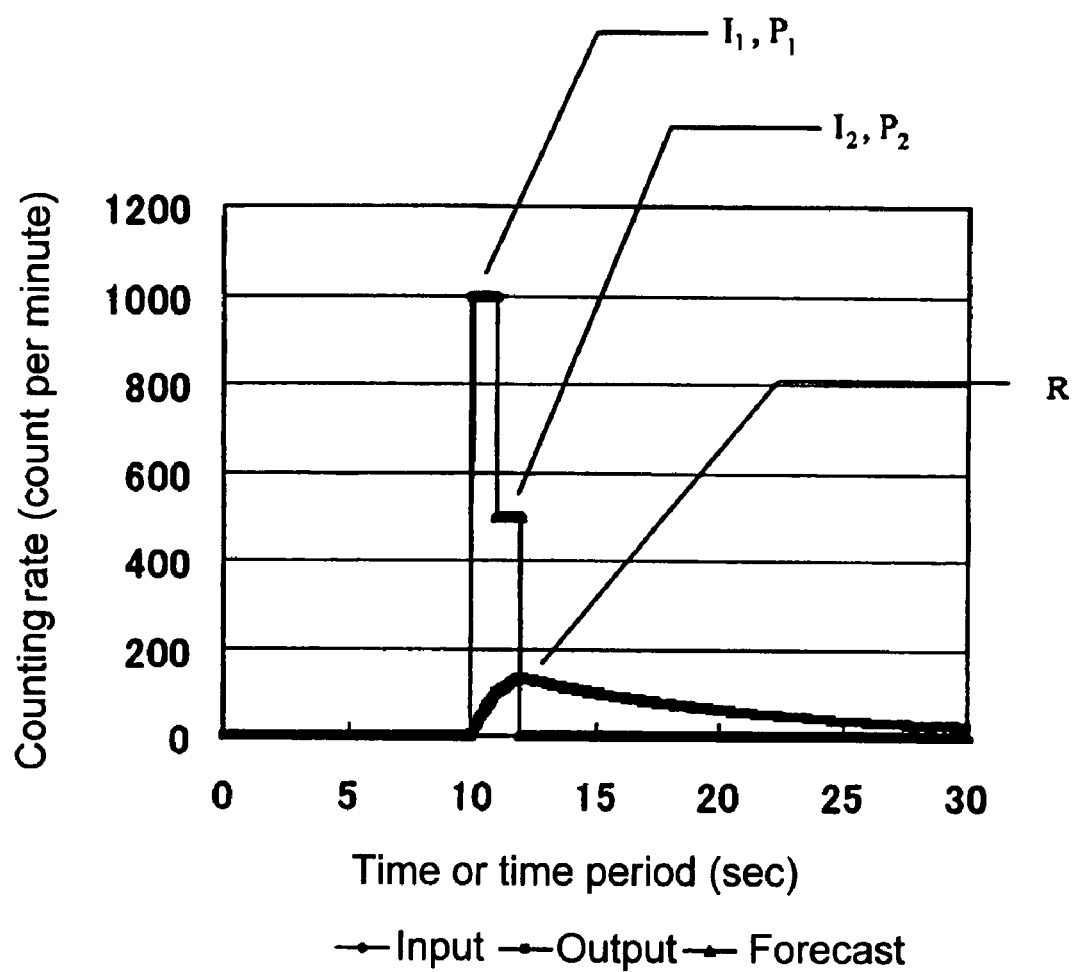
FIG. 7 is a diagram showing forecasting of close contaminations of the same.
Figure 8:
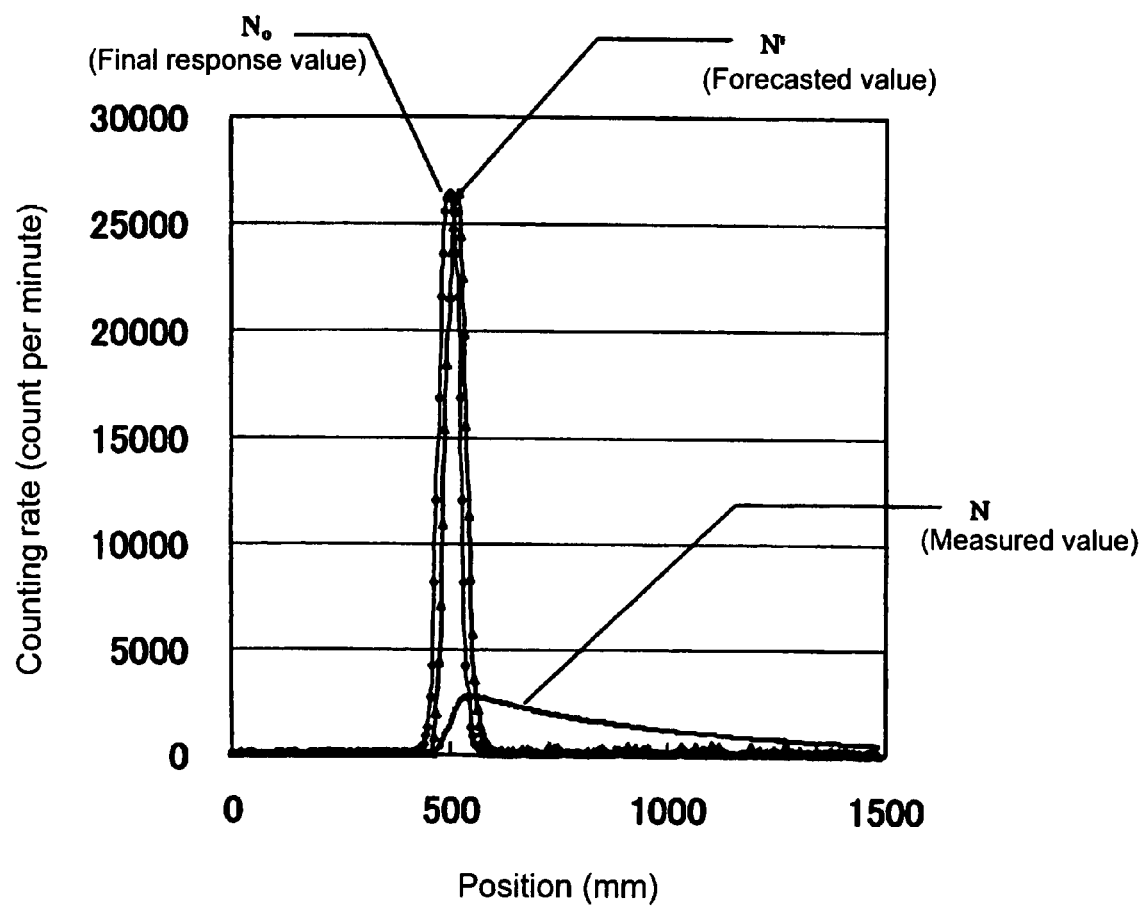
FIG. 8 is a diagram showing the total response curve and the forecasting curve of the same.
Figure 9:
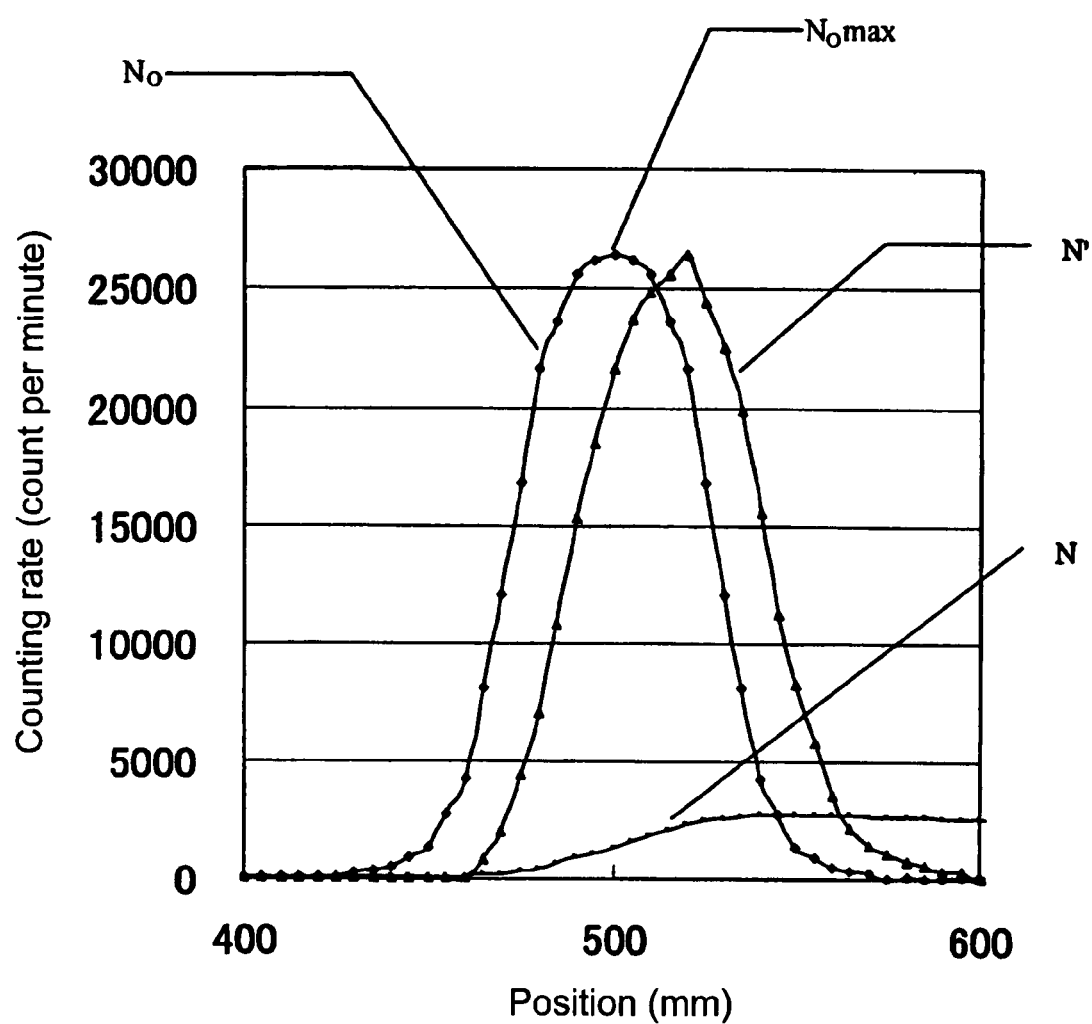
FIG. 9 is a diagram showing details of the response curve and the forecasting curve of the same.
Figure 10:
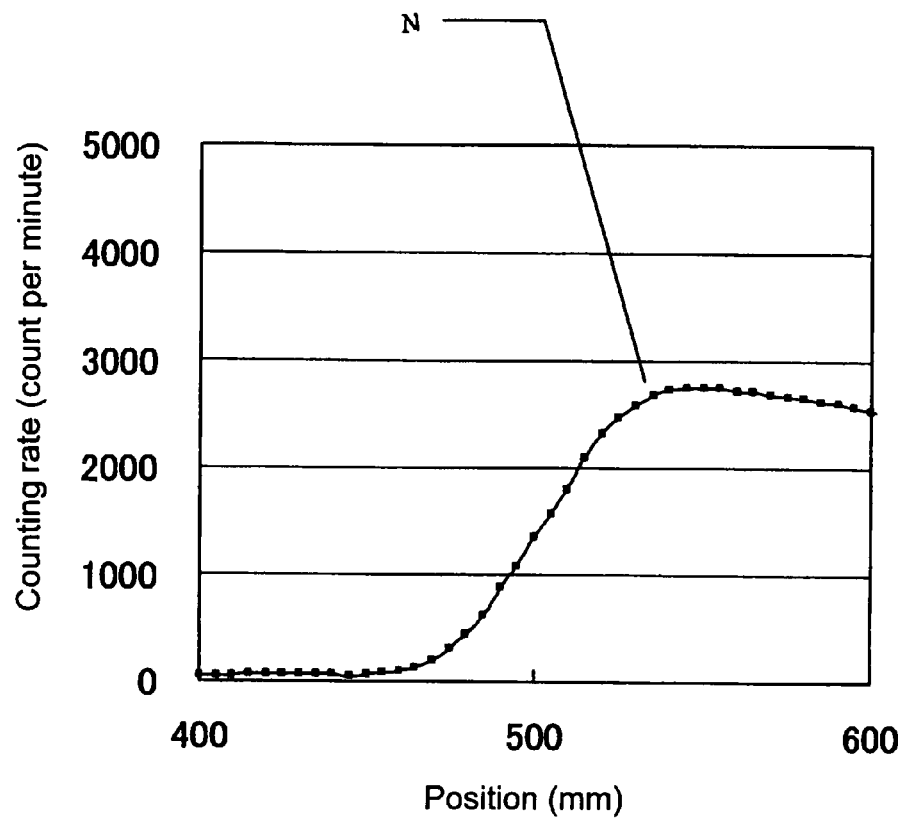
FIG. 10 is a diagram showing a rise of the measured value of the same in an enlarged manner.

A counting rate of a radiation source imitating a contaminated site was measured. The response curves N shown in FIG. 8 through FIG. 10 show changes in measured value as actual outputs of a GM survey meter depending on the position. The radiation source 110 is a thin sealed radiation source of strontium 90 with 3700 becquerels and a diameter of 20 mm. The detector was disposed so that the tip end of the probe 120 was positioned at 10 mm above the radiation source 110. The time constant T of the detector was set to 10 seconds. In a stable state after 60 seconds or more has elapsed since the probe became stationary, when the distance between the center of the probe tip end of the GM survey meter and the radiation source was 10 mm, the maximum counting rate was 26400 counts per minute. This was defined as a maximum measured value (also referred to as a maximum final response value) $N_0$max in the stationary state. The background was 100 counts per minute or less.

The movement speed of the survey meter was set to 50 mm per second, and sampling was performed every 5 mm, that is, every 0.1 seconds.

In the embodiment, as shown in FIG. 8 through FIG. 10, a radiation source imitating a contaminated site was disposed at a position of 500 mm, and $N_0$ was obtained based on Equation (5) from successive two points of the rise section of the response curve N from the moving start position at 0 mm to the moving end position at 1500 mm. Next, $N_0$ was obtained in the same manner from the end of the two points and the next point. By repeating this scanning five times while shifting the start point one by one, moving averages of the five times were obtained, and indicated as a forecasted response curve N'. The maximum value of the forecasted values was 26410 counts per minute. This is very close to 26400 counts per minute of the maximum final response value $N_0$max in the stationary state. It turns out that the maximum value of the forecasted values of the forecasted response curve N' is obtained in about 2 seconds after the rise. A value sufficiently larger than the background based on natural radiation is outputted as a forecasted value, so that even unskilled persons can also easily find an abnormal site. In the stage of decrease of the measured value, about 80 counts per minute were forecasted from the response values of two points, and equivalence to the background was forecasted.

In this embodiment, a moving average is used, so that a dose rate and a counting rate of radiation in which emission of radiation occurs one by one as a probabilistic event and having great scattering, can be reliably forecasted.

INDUSTRIAL APPLICABILITY

The present invention can be used as, for example, an air dose rate meter using a NaI scintillator. It can also be used as an area monitor. It can also be used as a counting rate meter using GM tube. It is also usable as, for example, a floor monitor using a GM counter or the like. It can be fixedly arranged or used movably like a survey meter, and various monitoring methods can be provided. Installation in a monitoring car, monitoring boat, helicopter or the like is possible, and monitoring while moving can be quickly and reliably performed.

The invention claimed is:

1. A radiation detecting method for detecting a dose rate or counting rate by using a radiation detector in an existence field of radiation or radioactive materials, comprising:
    measuring dose rates or counting rates of at least two points in an initial or middle stage; and
    calculating a final response value by using the measured dose rates or counting rates of at least two points before reaching the final response value.

2. The radiation detected value forecasting method of claim 1, wherein calculating further comprises:
    calculating the final response value $N_0$ by using dose rates or counting rates $N_1$ and $N_2$ of two points in the initial or middle stage based on the following equation:

$$N_0 = (N_2 - C*N_1)/(1-C)$$

provided that $C = \exp(-\Delta t/T)$
$\Delta t$: time between two points
T: time constant of response.

3. The radiation detecting value forecasting method of claim 1, wherein calculating further comprises:

calculating the final response value $N_0$ by using dose rates or counting rates $N_1$, $N_2$, and $N_3$ of three points in the initial or middle stage of response based on the following equation:

$$N_0 = (N_2 * N_2 - N_1 * N_3)/(2*N_2 - N_1 - N_3).$$

4. The radiation detecting value forecasting method of claim 3, further comprising:
   evaluating the efficiency of the radiation detector by calculating a time constant indicating a response of the radiation detector from an input to an output.

5. The radiation detecting method of claim 1, further comprising:
   determining a moving final response value $N_0$ by using a moving average of the final response value based on measured points within the field of radiation for obtaining high accuracy of the calculated value.

6. The radiation detected value forecasting method of claim 1, further comprising:
   outputting on at least one display of the radiation detector at least one of the dose rates or counting rates of at least two points in an initial or middle stage and the final response value.

7. A radiation detecting value forecasting method for detecting a dose rate or counting rate by using a radiation detector in an existence field of radiation or radioactive materials, comprising:
   measuring at least two values of dose rates or counting rates from at least two different positions within the field of radiation; and
   calculating a final response value based on the at least two measured values taken before reaching the final response value, wherein calculating further comprises:
      defining $N_1$ and $N_2$ as measured dose rates or counting rates measured at a time $t_1$ and a subsequent time $t_2$; and
      defining a stationary final response value as $N_0$, calculated by using a predetermined time constant T, based on the following equation:

$$N_0 = N_1 + (N_2 - N_1)/(1-C)$$

provided that $C = \exp[-(t_2 - t_1)/T]$.

8. A forecast responsive radiation detecting device for detecting a dose rate or counting rate by using a radiation detector in an existence field of radiation or radioactive materials, comprising:
   means for measuring dose rates or counting rates of at least two points in an initial or middle stage before reaching a final response value; and
   means for calculating the final response value by using at least two points of the measured dose rates or counting rates.

9. The forecast responsive radiation detecting device of claim 8, further comprising:
   means for outputting a final response value and a measured value.

10. The forecast responsive radiation detecting device of claim 8, further comprising:
    means for outputting a horizontal axis corresponding to at least one of time and position, and the final response value and at least one of the at least two measured points on a vertical axis.

11. The forecast responsive radiation detecting device of claim 10, wherein the vertical axis corresponds to time or position, and a forecasted value and a measured value can be both indicated on the horizontal axis.

12. The forecast responsive radiation detecting device of claim 8, wherein position information obtained by a GPS and a forecasted value and a measured value can be all indicated on a map.

13. The forecast responsive radiation detecting device of claim 8, wherein a warning to be issued when a forecasted value is equal to or more than a threshold is expressed as a sound or light.

14. The forecast responsive radiation detecting device of claim 8, wherein a warning to be issued when a forecasted value is equal to or more than a threshold is transmitted to a management device or control device by means of communications.

15. A radiation monitoring method for detecting a dose rate or counting rate by using a radiation detector in an existence field of radiation or radioactive materials, comprising:
    step for measuring dose rates or counting rates of at least two points in an initial or middle stage; and
    step for calculating a final response value by using the at least two measured dose rates or counting rates taken before reaching the final response value.

* * * * *